(12) United States Patent
Etemad et al.

(10) Patent No.: US 8,737,618 B2
(45) Date of Patent: May 27, 2014

(54) SECURE KEY DISTRIBUTION FOR OPTICAL CODE DIVISION MULTIPLEXED BASED OPTICAL ENCRYPTION

(75) Inventors: Shahab Etemad, Warren, NJ (US); Paul Toliver, Tinton Falls, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 79 days.

(21) Appl. No.: 12/824,610

(22) Filed: Jun. 28, 2010

(65) Prior Publication Data

US 2011/0200192 A1    Aug. 18, 2011

Related U.S. Application Data

(60) Provisional application No. 61/305,361, filed on Feb. 17, 2010.

(51) Int. Cl.
*H04K 1/00*    (2006.01)
(52) U.S. Cl.
USPC .......................................... 380/256; 380/278
(58) Field of Classification Search
USPC .................................................. 380/256–278
See application file for complete search history.

(56) References Cited

U.S. PATENT DOCUMENTS

| | | | |
|---|---|---|---|
| 6,608,721 | B1 | 8/2003 | Turpin et al. |
| 7,356,220 | B2 | 4/2008 | Chung et al. |
| RE40,923 | E | 9/2009 | Anderson et al. |
| 2004/0146297 | A1 | 7/2004 | Agarwal et al. |
| 2006/0116969 | A1 | 6/2006 | Hatanaka et al. |
| 2006/0171720 | A1 | 8/2006 | Agarwal et al. |
| 2007/0036553 | A1 | 2/2007 | Etemad et al. |
| 2007/0276765 | A1 | 11/2007 | Hazel et al. |
| 2009/0312476 | A1 | 12/2009 | Liu et al. |

OTHER PUBLICATIONS

Leaird (Experimental investigation of security issues in OCDMA: a code-switching scheme, Electronic Letters vol. 41 No. 14, Jul. 2005).*
Huang (Combining cryptographic and steganographic security with self-wrapped optical code division multiplexing techniques, Electronic Letters vol. 43 No. 25, 2007).*
Etemad_2007 (OCDM-based photonic layer "security" scalable to 100 Gbits/s for existing WDM networks, Journal of Optical Networking vol. 6 No. 7, 2007).*
Chapter12. (2009). Signal Processing Techniques for data confidentiality in OCDMA in access networks, Springer.*
Stallings (1995). Network and internetwork security: principles and practice. Prentice-Hall. pp. 87-89.*

(Continued)

*Primary Examiner* — Brian Shaw
(74) *Attorney, Agent, or Firm* — Philip J. Feig (57) ABSTRACT

An optical communications network incorporating photonic layer security, with secure key exchange without loss of data, and a method of operating the network are disclosed. The network comprises a transmit side and a receive side. The transmit side includes first and second scramblers and a transmit side switch; and the receive side includes first and second descramblers and a receive side switch. The scramblers use encryption keys to encrypt optical signals, and the descramblers use the encryption keys to decrypt the encrypted optical signals. The encryption keys can be updated randomly and at will by installing new encryption keys on the scramblers and descramblers, and the transmit side and receive side switches are synchronized so that all of the optical signals that are encrypted using a new or updated encryption key are decrypted using the same new or updated encryption key.

9 Claims, 7 Drawing Sheets

(56) References Cited

OTHER PUBLICATIONS

International Search Report, dated Apr. 20, 2011 (2 pages).

Etemad, et al., "An Overlay Photonic Layer Security Approach Scalable to 100 Gb/s", IEEE Communications Magazine, Aug. 2008, pp. 32-39.

* cited by examiner

FIG. 3A
OCDM-BASED ENCRYPTION WITH PROVABLE SECURITY
PRIOR ART

FIG. 3B n IS # OF λ m IS # OF CODES IN USE, AND d IS RATE OF INTER-CODE PHASE CHANGE

FIG. 4
KEY EXCHANGE FOR ODCM-BASED PLS

SECURE KEY DISTRIBUTION FOR OPTICAL CODE DIVISION MULTIPLEXED BASED OPTICAL ENCRYPTION

CROSS REFERENCE TO RELATED APPLICATIONS

This application claims the benefit of U.S. Provisional Patent Application No. 61/305,361 filed Feb. 17, 2010 which is incorporated by reference as if set forth at length herein.

BACKGROUND OF THE INVENTION

The present invention generally relates to optical code division multiplexed communication networks incorporating photon layer security. More specifically, the invention relates to the secure distribution of the coding/encoding key used in such networks.

Various communications schemes have been used to increase data throughput and to decrease data error rates as well as to generally improve the performance of communications channels. As an example, frequency division multiple access ("FDMA") employs multiple data streams that are assigned to specific channels disposed at different frequencies of the transmission band. Alternatively, time division multiple access ("TDMA") uses multiple data streams that are assigned to different timeslots in a single frequency of the transmission band.

In many communication architectures, spectral phase encoding code division multiple access (SPE-CDMA) has supplanted FDMA and TDMA. SPE-CDMA is a form of spread spectrum communications that enables multiple data streams or channels to share a single transmission band at the same time. The SPE-CDMA multiplexing approach is well known and is explained in detail, e.g., in the text "CDMA: Principles of Spread Spectrum Communication," by Andrew Viterbi, published in 1995 by Addison-Wesley. Basically, in SPE-CDMA, the bandwidth of the data to be transmitted (user data) is much less than the bandwidth of the transmission band. Unique "pseudonoise" keys are assigned to each channel in a SPE-CDMA transmission band. The pseudonoise keys are selected to mimic Gaussian noise (e.g., "white noise") and are also chosen to maximal length sequences in order to reduce interference from other users/channels. One pseudonoise key is used to modulate the user data for a given channel.

During modulation, the user data is "spread" across the bandwidth of the SPE-CDMA band. That is, all of the channels are transmitted at the same time in the same frequency band. The introduction of noise and interference from other users during transmission is inevitable (collectively referred to as "noise"). Due to the nature of the pseudonoise key, the noise is greatly reduced during demodulation relative to the user's signal because when a receiver demodulates a selected channel, the data in that channel is "despread" while the noise is not "despread". Thus, the data is returned to approximately the size of its original bandwidth, while the noise remains spread over the much larger transmission band. The power control for each user can also help to reduce noise from other users.

SPE-CDMA has been used commercially in wireless telephone ("cellular") and in other communications systems. Such cellular systems typically operate at between 800 MHz and 2 GHz, though the individual frequency bands may be only a few MHz wide. An attractive feature of cellular SPE-CDMA is the absence of any hard limit to the number of users in a given bandwidth, unlike FDMA and TDMA. The increased number of users in the transmission band merely increases the noise to contend with. However, as a practical matter, there is some threshold at which the "signal-to-noise" ratio becomes unacceptable. This signal-to-noise threshold places real constraints in commercial systems on the number of paying customers and/or data rates that can be supported.

Recently, SPE-CDMA has been used in optical communications networks. Such optical SPE-CDMA (SPE-OCDMA) networks generally employ the same general principles as cellular SPE-CDMA. However, unlike cellular SPE-CDMA, optical SPE-CDMA signals are delivered over an optical network. As an example, a plurality of subscriber stations may be interconnected to the hub by a respective bidirectional optical fiber link. Each subscriber station has a transmitter capable of transmitting optical signals, and each station also has a receiver capable of receiving transmitted signals from all of the various transmitters in the network. The optical hub receives optical signals over optical fiber links from each of the transmitters and transmits optical signals over optical fiber links to all of the receivers. An optical pulse is transmitted to a selected one of a plurality of potential receiving stations by coding the pulse in a manner such that it is detectable by the selected receiving station but not by the other receiving stations.

For example, such coding may be accomplished by dividing each pulse into a plurality of intervals known as "time chips". Each time chip may have the logic value "1", as indicated by relatively large radiation intensity, or may have the logic value "0", as indicated by a relatively small radiation intensity. The chips comprising each pulse are coded with a particular pattern of logic "1"'s and logic "0"'s that is characteristic to the receiving station or stations that are intended to detect the transmission. Each receiving station is provided with optical receiving equipment capable of regenerating an optical pulse when it receives a pattern of chips coded in accordance with its own unique sequence but cannot regenerate the pulse if the pulse is coded with a different sequence or code.

Alternatively, as another example, the optical network utilizes SPE-CDMA that is based on optical frequency domain coding and decoding of ultra-short optical pulses. Each of the transmitters includes an optical source for generating the ultra-short optical pulses. The pulses comprise Fourier components whose phases are coherently related to one another. A "signature" is impressed upon the optical pulses by independently phase shifting the individual Fourier components comprising a given pulse in accordance with a particular code whereby the Fourier components comprising the pulse are each phase shifted a different amount in accordance with the particular code. The encoded pulse is then broadcast to all of or a plurality of the receiving systems in the network. Each receiving system is identified by a unique signature template and detects only the pulses provided with a signature that matches the particular receiving system's template.

As optics dominates digital communications, particularly over long distances, high data rate security sensitive applications carried over public fiber optics networks require protection against eavesdropping and//or spoofing, both of which are hard to provide at 40 Gb/s and not practical at 100 Gb/s data rates with today's technology. Currently, for example, the financial sectors are required by the Office of the Comptroller of Currency in the US to encrypt optical communications leaving their secure locations in the near future. With the 100 GbE standard on the horizon, serial datacom rates will eventually outpace the single-channel capabilities of telecom transport interfaces. Systems are needed to manage the transport of terabits of data generated from multitudes of data gathering and processing nodes delivered on demand to users in secure campuses. The cost-effective use of existing public dark fiber and the emerging transparent reconfigurable optical add-drop multiplexer (ROADM)-based networks create a compelling case for photonic layer security (PLS) for high bandwidth needs where digital solutions, such as advanced encryption systems (AES), may impose a relatively high end-to-end cost.

SUMMARY OF THE INVENTION

One aspect of the present invention provides a method of encrypting and decrypting optical signals in an optical communication network. This method comprises encrypting a series of optical signals using a pair of encryptors and an encryption key to form a series of encrypted optical signals; and decrypting the series of encrypted optical signals. In accordance with this aspect of the invention, this method further comprises updating the encryption key used to encrypt the series of optical signals, including using a first of the encryptors and a first encryption key to encrypt said series of optical signals; installing a new encryption key on the second of the encryptors; and when the new encryption key is installed on said second of the encryptors, switching the encrypting of the series of optical signals from the first of the encryptors to the second of the encryptors.

In one embodiment, the decrypting includes using a pair of decryptors to decrypt the series of encrypted optical signals; and the updating the encryption key includes using a first of the decryptors and the first encryption key to decrypt the series of encrypted optical signals; installing the new encryption key on the second of the decryptors; and when the new encryption key is installed on the second of the decryptors, switching the decrypting of the series of encrypted optical signals from the first of the decryptors to the second of the decryptors.

In an embodiment, the updating the encryption key further includes synchronizing the switching of the encrypting of the series of optical signals and the switching of the decrypting of the encrypted optical signals, whereby optical signals, of said series of optical signals, that are encrypted using the new encryption key are decrypted using the new encryption key.

In one embodiment, the encrypting includes using an encrypt side switch to direct optical signals, of the series of optical signals, selectively to one of the first and second encryptors; and the decrypting includes using a decrypt side switch to direct encrypted optical signals, of said series of encrypted optical signals, selectively to one of the first and second decryptors.

In an embodiment, the updating the encryption key includes encrypting the new encryption key using the first encryption key to form an encrypted key; and decrypting the encrypted key, on a receive side of the communications network, for installation in said second of the decryptors. In this embodiment, the updating the encryption key may further include sending the encrypted key from a transmit side of the communications network to the receive side of the communications network. In this embodiment, the new encryption key may be encrypted by passing the new encryption key through said first of the encryptors, and using said first of the encryptors and the first encryption key to encrypt the new encryption key.

In another aspect, the invention provides an optical communications network incorporating photon layer security. The communications network comprises a transmit side and a receive side. The transmit side includes first and second scramblers and a transmit side switch, and the receive side includes first and second descramblers and a receive side switch. In accordance with this aspect, the first and second scramblers use encryption keys to encrypt optical signals to form encrypted optical signals, and the transmit side switch is used for directing the optical signals selectively to one of the first and second scramblers. On the receive side, the first and second descramblers use the encryption keys to decrypt the encrypted optical signals, and the receive side switch is used for directing the encrypted optical signals selectively to one of the first and second descramblers.

In accordance with this aspect, the communications network also comprises a control module or system for replacing the encryption keys used to encrypt and decrypt the optical signals. This replacing is done by installing new or updated encryption keys on the scramblers and descramblers, and synchronizing operation of the transmit side and receive side switches are fast enough so that all of the optical signals that are encrypted using a new or updated encryption key are decrypted using the same new or updated encryption key a number of ways may be used to instruct the switches to switch. For example, the instructions may be part of the encryption key that is sent to the receive side, or may come from a source outside of the communications network.

In one embodiment, the control module replaces one of the encryption keys with an updated encryption key by installing the updated encryption key on one of the scramblers and on one of the descramblers, controlling the transmit side switch to direct a group of the optical signals to the scrambler having the updated encryption key, and controlling the transmit side switch to direct the encrypted optical signals, formed from said group of the optical signals, to the descrambler having the updated encryption key.

In an embodiment, the updated encryption key is sent from the transmit side of the optical communications network to the receive side of the optical communications network. In one embodiment, the updated encryption key itself is encrypted on the transmit side of the communications network using the previous encryption key to form an encrypted updated key, and this encrypted updated key is sent from the transmit side of the communications network to the receive side of the communications network.

In accordance with another aspect of the invention, a method is provided for encoding and transmitting optical signals in a communications network. This method comprises, on a transmit side of the communications network, modulating each signal of a set of optical signals to form a set of modulated signals, encoding the set of modulated optical signals by phase shifting at least some of the signals of said set of modulated signals to form a set of encoded modulated signals, and combining the set of encoded modulated signals to form a composite optical signal. This composite optical signal is encrypted by passing the composite optical signal through a first phase scrambler and using an encryption key to encrypt the composite optical signal and form an encrypted optical signal. This method further comprises, on a receive side of the communications network, decrypting the encrypted optical signal by passing the encrypted optical signal through a first phase descrambler and using the encryption key to decrypt the encrypted optical signal.

In accordance with this aspect of the invention, the method further comprises changing the encryption key used to encrypt the composite optical signal by installing a new encryption key on a second phase scrambler; and when the new encryption key is installed on the second phase scrambler, switching the composite optical signal from the first phase scrambler to the second phase scrambler, and encrypting the composite optical signal using the second phase scrambler and the new encryption key.

In one embodiment, the method further comprises changing the encryption key used to decrypt the encrypted optical signal by installing the new encryption key on a second phase descrambler; and when the new encryption key is installed on the second phase descrambler, switching the encrypted composite signal from the first phase descrambler to the second phase descrambler.

In an embodiment, the encrypted optical signal is switched from the first phase descrambler to the second phase descrambler at substantially the same time as the composite optical signal is switched from the first phase scrambler to the second phase scrambler. In one embodiment, the new encryption key is itself encrypted using the previous encryption key to form an encrypted new key; and the new encrypted key is decrypted, on the receive side of the communications network, for installation in said second phase descrambler. In an embodiment, a portion of the composite optical signal may be buffered while installing the new encryption key on the second phase scrambler.

DETAILED DESCRIPTION OF EMBODIMENTS OF THE INVENTION

Figure 1:
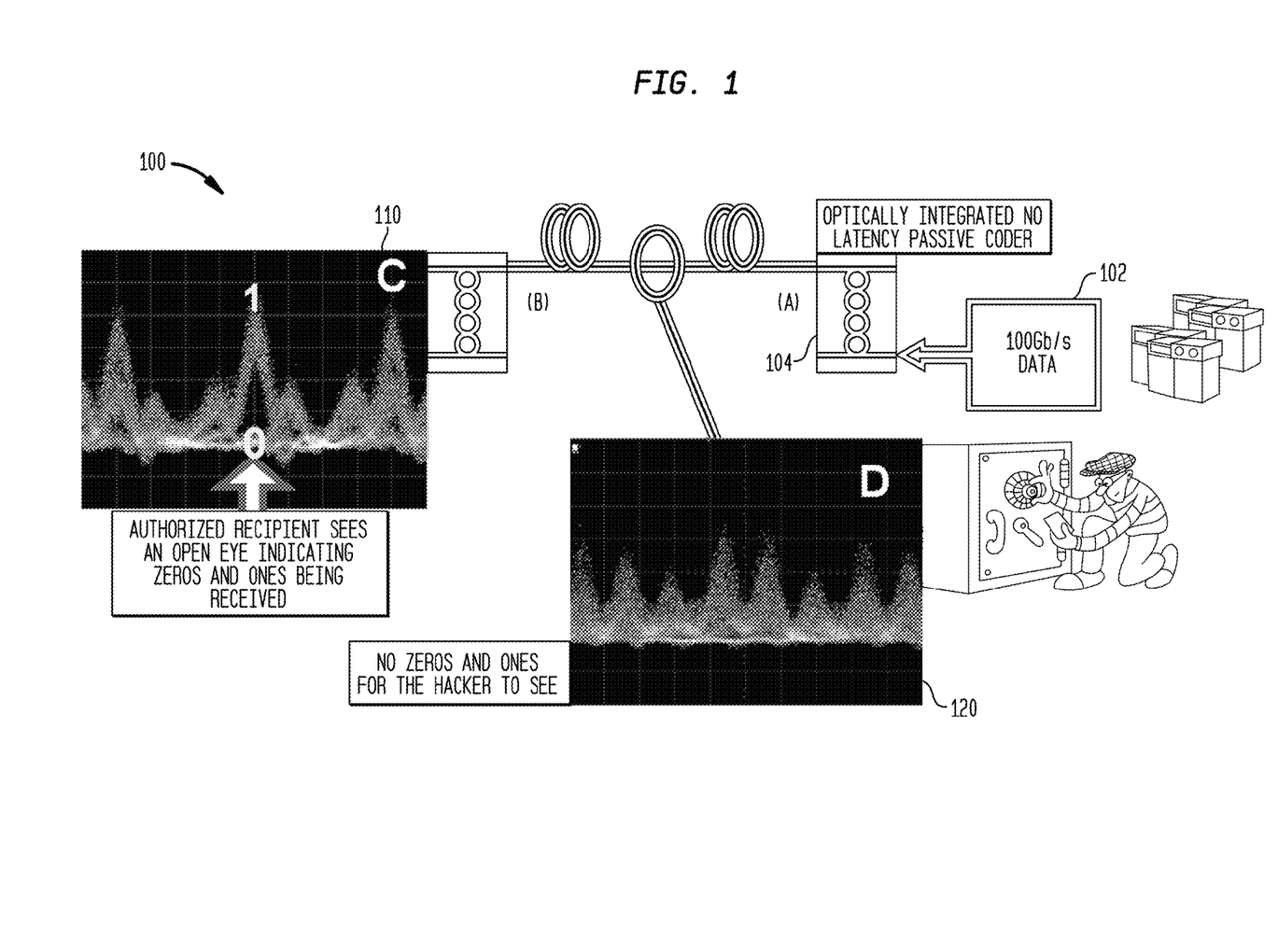
FIG. 1 generally illustrates the operation of an optical code division multiplexed (OCDM) network utilizing photonic layer security (PLS).

FIG. 1 provides a high-level view of an optical code-division multiplexing (OCDM) communications network 100 incorporating photonic layer security. A high rate 100 Gb/s RZ optical signal 102 can be multiplexed from a multitude of lower rate tributaries (e.g., 10×10 Gb/s or 4×25 Gb/s), each of which is coded by its unique OCDM code, and the combined coded tributaries are injected into a common phase scrambler 104. Conceptually, the coherent summation of these optically encoded tributaries can then be passed through a shared phase scrambler before exiting the secure location. The scrambler acts as the key and is a crucial element of the system security due to its large number of possible phase settings.

The authorized recipient 110 with the correct key retrieves the ones and zeros of the several decoded signals. The unauthorized eavesdropper does not see ones and zeros to decipher the information or record the cipher text for post processing. Since the scrambler/descrambler setting can be changed at will and the search space for guessing the setting of the key is large, an exhaustive attack is unlikely to be successful. Archival or forensic attack is also difficult since no ones and zeros can be seen in the tapped signal, shown at 120 in FIG. 1. Furthermore, spoofing of data is made considerably more challenging, since without the key, the signal received by an authorized recipient would look like that at 120 with no ones and zeros present. As a result, the integrity of the received data is guaranteed.

Figure 2:
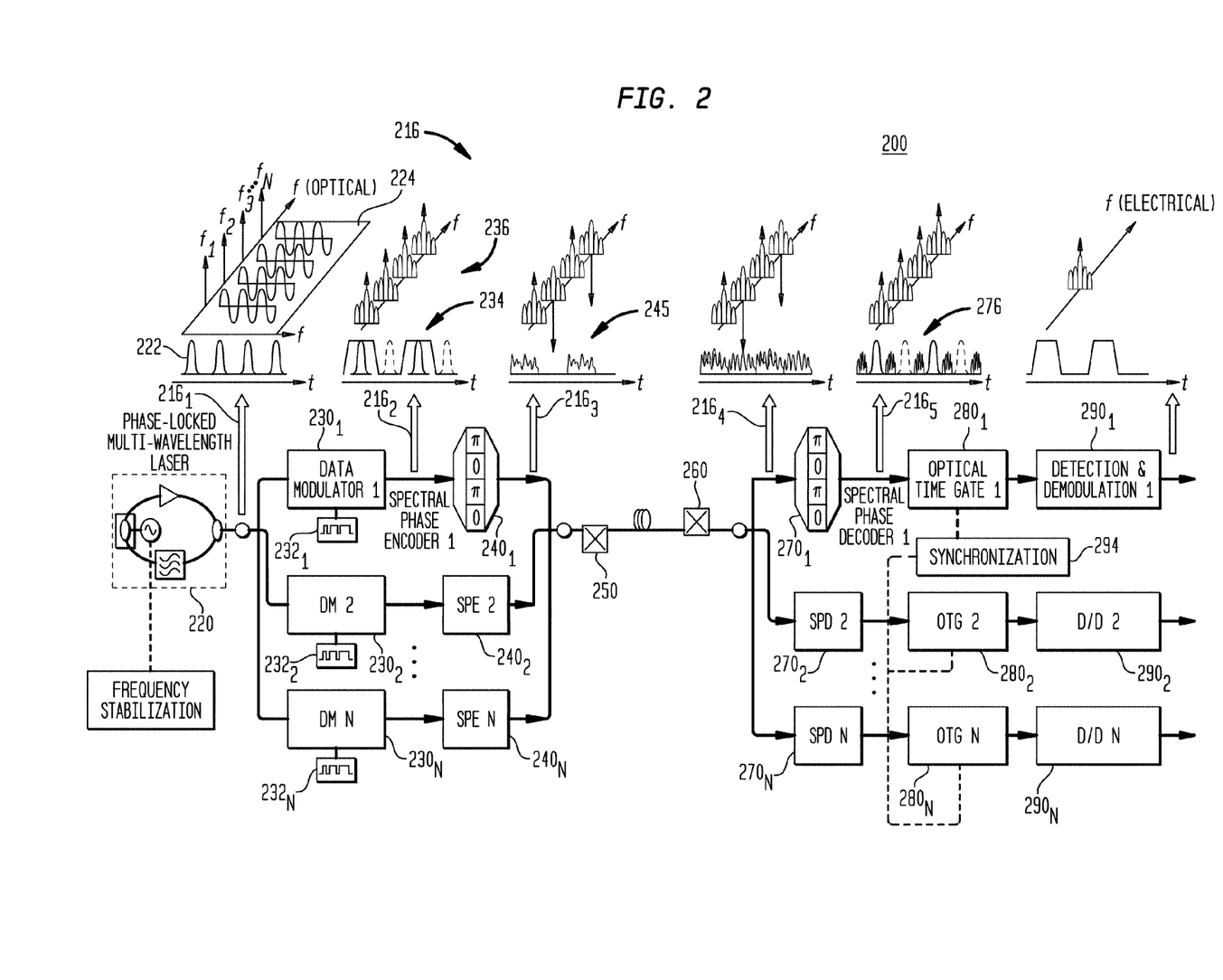
FIG. 2 shows in more detail an OCDM communication network incorporating photonic layer security.

A more detailed example of a multi-user OCDM communication network incorporating photonic layer security is shown in FIG. 2. In addition to illustrating an overall system architecture 200, FIG. 2 also includes a diagram 216 that depicts signal flows through the system in the time and frequency domain. In particular, the spectrum and temporal intensity of the optical source 220 is identified by arrow $216_1$; after ON/OFF data modulation by arrow $216_2$; after phase encoding by arrow $216_3$; after mixing all users by arrow $216_4$; after the decoder of the first user by arrow $216_5$; and after time gating and optical-to-electrical (O/E) conversion by arrow $216_6$.

The optical source 220, in this embodiment, comprises a phase-locked multi-wavelength laser. In accordance with this aspect of the present invention, for example, eight lines in the output spectrum comprising eight frequency bins or chips are used to communicate user data across the system 200. As FIG. 2 shows via arrow $216_1$, a train or sequence of pulses 222 are generated by the source 220. The spectral content of each pulse is depicted in the frequency plots 224.

In general, the electric field m(t) output of the laser 220 is a set of N equi-amplitude phase-locked laser lines:

$$m(t) = A \sum_{i=1}^{N} e^{j(2\pi f_i t + \phi)} \qquad (1)$$

where $f_i = 193$ THz$+(i-1)\Delta f$ are equally spaced frequencies. Signal m(t) is a periodic signal comprising a train of pulses spaced $1/\Delta f$ seconds apart and each pulse having a width equal to $1/(N\Delta f)$ seconds. Equation (1) can also be expressed as:

$$m(t) = \sum_k p(t - kT) \qquad (2)$$

where p(t) represents a pulse of duration $T=1/\Delta f$ whose energy is mostly confined in the main lobe of width $1/(N\Delta f)$.

In accordance with the sample network of FIG. 2, N=8 and $\Delta f$=10 GHz as those variables are used in equations (1) and (2). In the practical sense, the total spectral width of the source's output is limited to a total spectral width of 80 GHz, which results in each pulse having a width of approximately 12.5 picoseconds (ps).

The output signal 222 is provided to each of the data modulators $230_1$ through $230_N$. In keeping with the present example N=8. As such, the system preferably includes 8 users or subscribers that each provides data $232_1$ through $232_N$ that is used to respectively modulate the pulse train or output signal 222. In the system of FIG. 2, the data modulators 230 operate to provide ON/OFF keying resulting in time-domain signal 234. In the time domain signal 234, the pulses with a solid outline indicate a "1" symbol or bit and the pulses with dotted outline represent a "0" symbol or bit, as previously discussed. The spectral content of such a signal is shown in frequency plot 236.

Other modulations, including DPSK (different phase shifting keying), or the higher data content DQPSK (different quaternary phase shifting keying) may be used by the system 200.

Each of the modulated optical pulse signals is then fed to respective spectral phase encoders $240_1$ through $240_N$ as shown. Encoding comprises separating each of these frequency bins, shifting its phase, in this case by 0 or $\pi$, as prescribed by the choice of code, and recombining the frequency bins to produce the coded signal. When the relative phases of the frequencies are shifted, the set of frequencies is unaltered, but their recombination results in a different temporal pattern, e.g., a pulse shifted to a different part of the bit period, multiple pulses within the bit period, or noise-like distribution of optical power. Each OCDM code is desirably defined by a unique choice of phase shifts. Preferably, a set of codes is chosen that make efficient use of the spectrum within the window, and that can also be separated from each other with acceptable error rates, even when a maximum number of codes occupy the window.

Each tributary drives its own data modulator DM and is identified by its own spectral phase encoder SPE. After combining all the data carrying codes, the optical phase of the aggregate is scrambled by 250. The process is reversed at the receiving end, as shown in FIG. 2, by descrambler 260. The scrambler/descrambler is effectively another coder with the capability of setting the phase of each frequency bin anywhere between 0 and $\pi$. They are diagonal or monomial matrixes that increase the search space exponentially. The relative phase setting of the scrambler 250 and descrambler 260 are the shared key. The functions of the encoders $240_N$ and scrambler 250 can be combined in one unit by modifying the encoder's setting. Similarly the function of the decoders $270_N$ and descrambler 260 can be combined in one unit by modifying the decoders setting. This modification may be used in implementing a monomial matrix option of the scrambler/descrambler to include frequency shuffling.

For the system 200, in one embodiment, the set of Hadamard codes, which are orthogonal and binary. This choice is desirable in that it can achieve relatively high spectral efficiency with minimal multi-user interference (MUI). In accordance with an aspect of the present invention, this coding schemes offers synchrony in the sense that MUI is zero at the time that the decoded signal is maximum because the signal is maximal and can be picked up by time-gating 280, $280_N$. The number of orthogonal codes is equal to the number of frequency bins, and hence, relatively high spectral efficiency is possible. Binary Hadamard codes are converted to phase codes by assigning to +1's and −1's phase shifts of 0 and $\pi$, respectively. To encode data that contains a spread of frequencies, as opposed to the unmodulated pulse stream, which contains only the initial comb of frequencies produced by the MLL, it is preferable to define frequency bins around the center frequencies. Encoding data then comprises applying the phase shift associated with a frequency to the entire bin. The output of the phase encoder is then a signal obtained by summing the phase-shifted frequency components of the modulated signal, or equivalently, by convolving the modulated optical signal at the input of the phase encoder with the inverse Fourier transform of the phase code.

Applying any of these orthogonal codes (except for the case of Code 1, which leaves all phases unchanged) results in a temporal pattern which has zero optical power at the instant in time where the initial pulse would have had its maximum power. Although this choice of orthogonal codes implies synchronicity as a system requirement, since desynchronization will move unwanted optical power into the desired signal's time slot, careful code selection allows some relaxation of this requirement. For example, simulations indicate that for four simultaneous users transmitting at 2.5 Gb/s with comb frequency spacing ($\Delta f$ of 5 GHz, and using a suitably chosen set of four codes among the set of 16 Hadamard codes of length 16, up to 15 ps of relative delay can be tolerated with a power penalty within 1 dB at a BER of $10^{-9}$. Better resiliency to synchronism may be achieved by using multiphase codes.

Phase coding of the individual spectral components requires a demultiplexer with sufficient resolution and pathlength stability and a means of shifting phases independently for each frequency. In an embodiment of the present invention, a coder/decoder is used to encode the signal using a set of Hadamard codes. The coder/decoder is based on a modified reflective geometry optical demultiplexer. Any suitable coder/decoder may be used in the present invention. For example, coder/decoders that may be used in embodiments of the invention are disclosed in U.S. patent application publication no. 2007/0036553 and in U.S. Pat. No. 6,608,721.

Figure 3A:
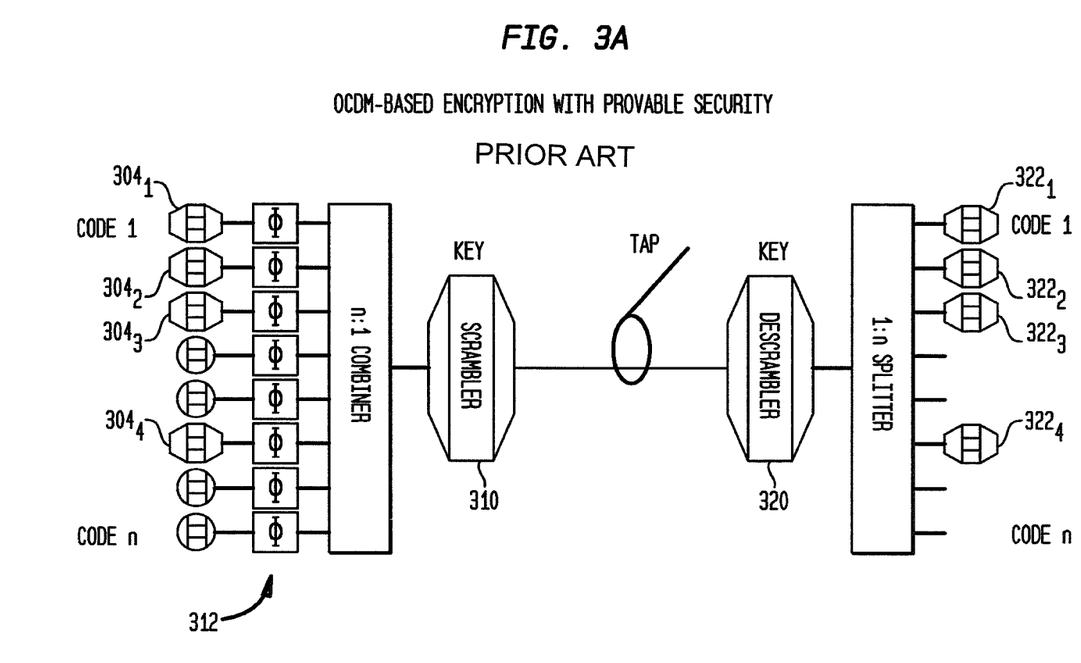
FIG. 3A illustrates a prior art methodology for providing a provable security in the optical network by adding entropy and changing intercede phase shift, Φ, in the network of FIG. 2.

FIG. 3A is a diagram showing a possible known plain text (KPT) attack against the data sent from the transmitter to the receiver in the network of FIG. 2. On the transmitting side, FIG. 3A shows data from four tributaries on hexagonal coders $304_1$, $304_2$, $304_3$ and $304_4$, and several rounded coders with a scrambler 310 with a fixed key but updateable on a time scale much longer than the data rate (milliseconds). All of the rounded coders carry random noises that are mixed with the data, and the phase of the aggregates is scrambled. The $\Phi$ boxes 312 represent the inter/intra code phase settings that can be updated. On the receiving side, a matching descrambler 320 with fixed key delivers the tributaries positioned on decoders $322_1$, $322_2$, $322_3$ and $322_6$. The channels carrying noise are ignored by the authorized recipient but prevent the hacker from deciphering the data.

Figure 3B:
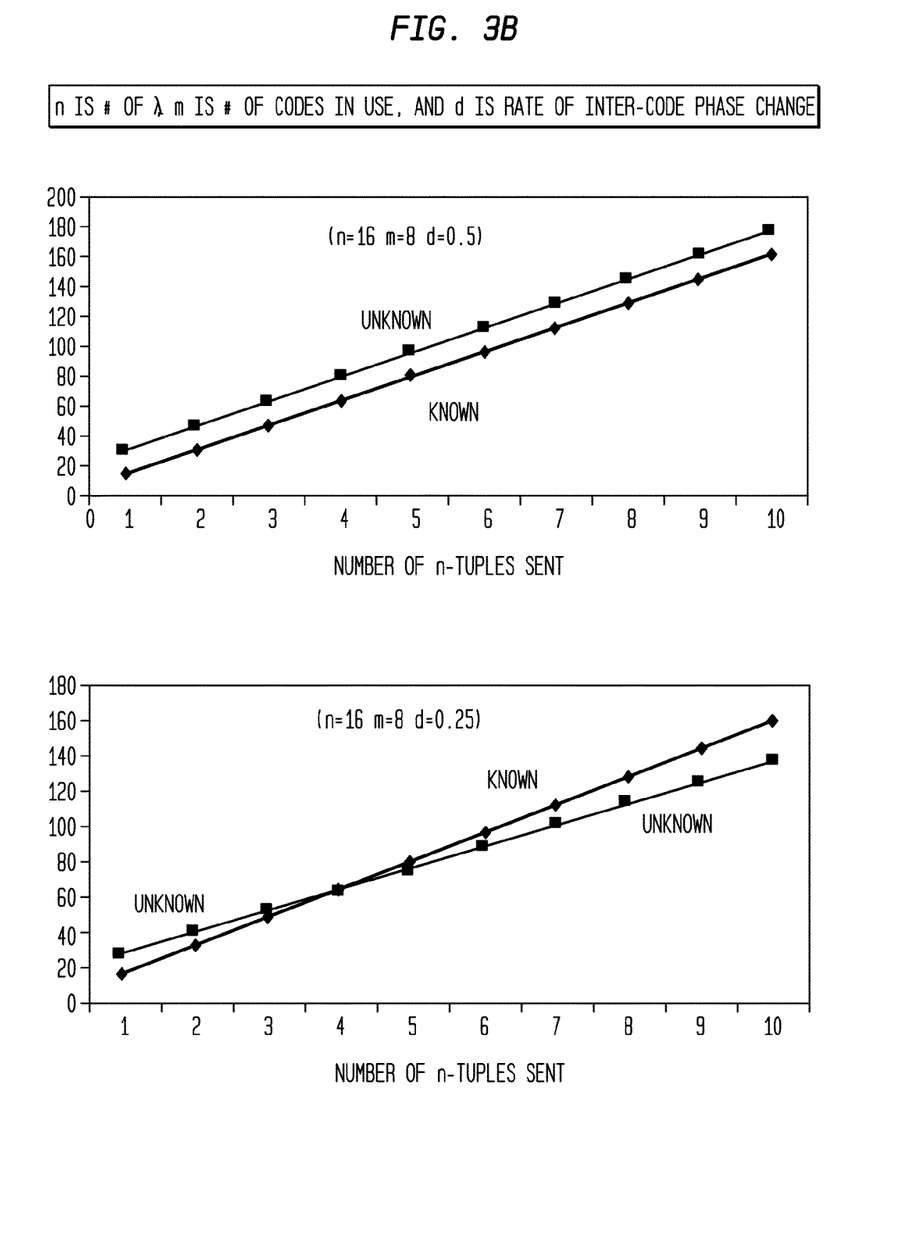
FIG. 3B depicts the results of successive n-tuple optical field measurements of optical field transmitted in the system of FIG. 2 for different intercede phase updates.

A solution against known plain text (KPT) attack can be provided by infusion of entropy and randomization of intercede phase change, the $\Phi$s. FIG. 3B analyzes the results of successive n-tuple optical field measurements where n=16 frequencies, m=8 codes carrying random unshared data streams, and d is the update rate of change of $\Phi$s as a fraction of the KPT rate. In solving for the shared random key of length n=16 in this case, for each (n−m) bits of KPT the attacker has n=16 known n-tuple values of the optical field, but has to eliminate the unshared random $\Phi$s and m=8 unshared random data. For the parameters in FIG. 3B, after four n=tuple measurements, the attacker can solve for the shared key setting. However, by increasing the update rate for intercede phase $\Phi$ from d=0.25 to d=0.5, no matter how many n-tuple measurements are done, the unshared noise and $\Phi$ cannot be eliminated, the key cannot be extracted, and the eavesdropper must fall back to a brute force search.

Figure 4:
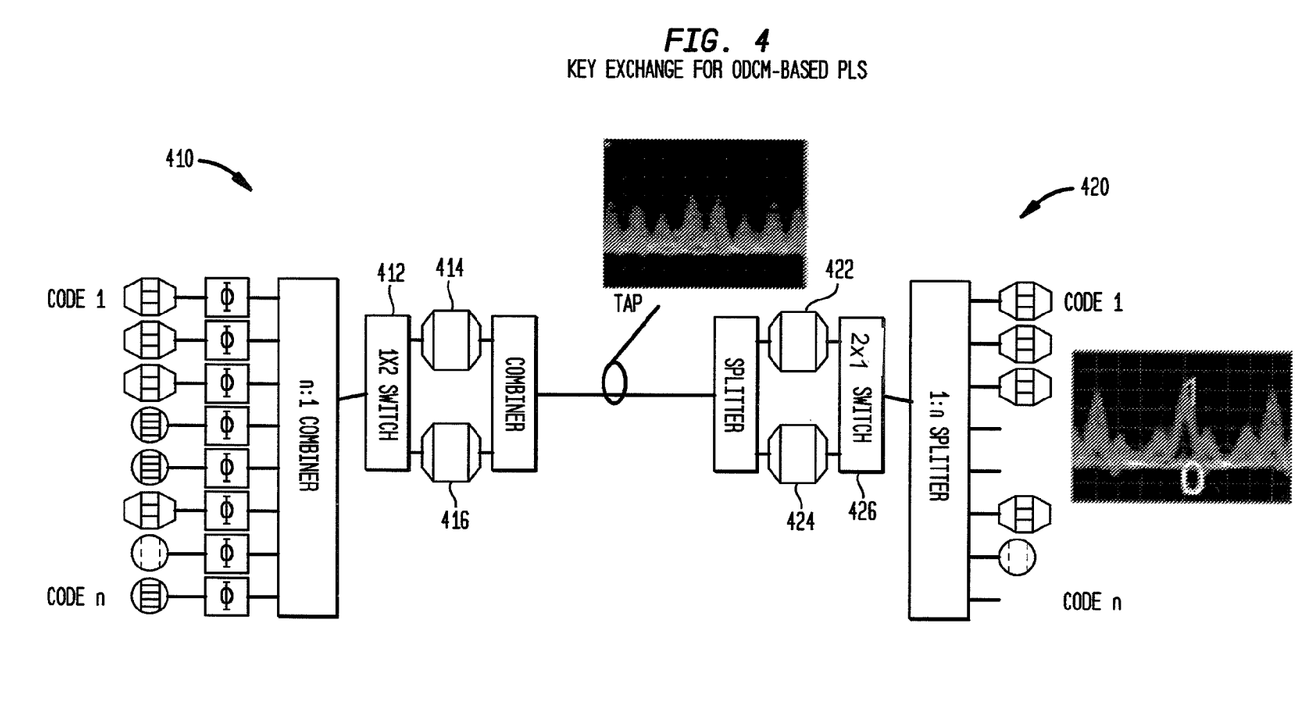
FIG. 4 shows a photonic layer security architecture for a secure key distribution with no loss of data in an OCDM network, in accordance with an embodiment of the invention.

The present invention provides a methodology for the secure exchange of the key through its updating at will without the loss of data. With reference to FIG. 4, on the transmitting end 410, the scrambler of FIG. 3A is replaced by a fast 1×2 optical switch 412 that directs the combined codes through one or the other one of the two fixed scramblers 414, 416 with different key settings. On the receiving end 420, the descrambler of FIG. 3A is replaced by two fixed descramblers 422, 424 with key settings matching those of the transmitting end followed by a fast 2×1 optical switch 426. The optical switches 412, 426 are faster than the data rate of the tributaries and change in synchrony under instruction from the channel on code 7 of both transmitting and receiving ends. In updating the key, the information on sending the aggregate channel through which fixed scrambler is given to the two switches 412, 426 to change simultaneously. The buffering helps with the integrity of the data during switching. After the key is updated by the synchronous switching of the fixed scrambler, the key setting of the scrambler that was being used is refreshed to be ready for the switching back operation. The setting of the key and the duration of time before switching back can be random and communicated on the channel 7. In this architecture, the key is mixed with the data transmission and transmission of the key enjoys the same photonic layer security.

Figure 5:
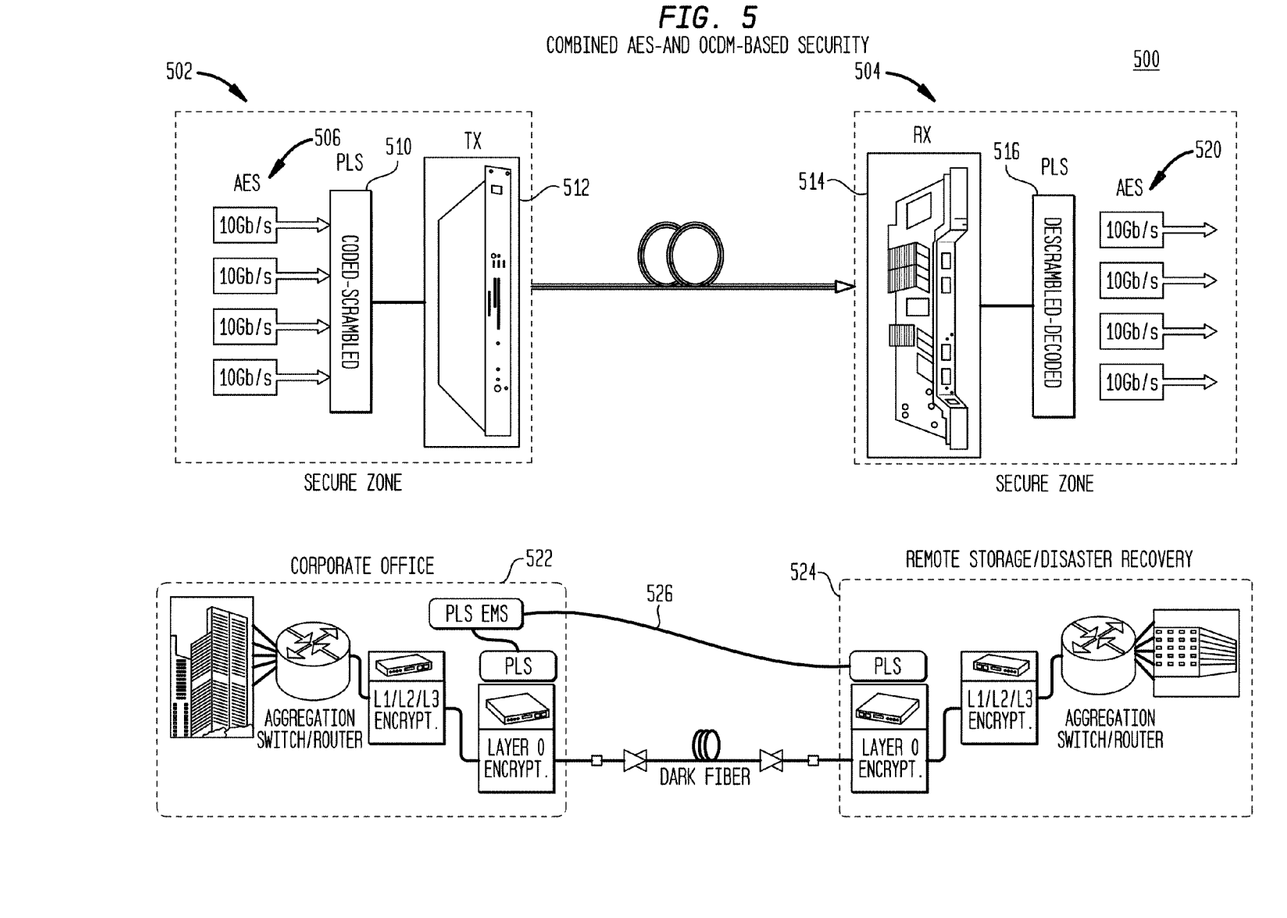
FIG. 5 illustrates an embodiment of the invention in which Advanced Encryption Standard is combined with OCDM-based Photonic Layer Security.

FIG. 5 illustrates an embodiment of the invention that combines Advanced Encryption Standard (AES) and OCDM-based security. The depicted network 500 includes a transmit side 502 and a receive side 504. On the transmit side 502, a series of 10 Gb/s data streams 506, encrypted according to the AES, are PLS coded and scrambled at 510. The data streams are then combined and encoded at 512, and then transmitted to receive side 504. On the receive side, the data are decrypted at 514, and then descrambled and decoded at 516, resulting in a series of data streams 520.

In this procedure, both the transmit and receive sides are secure zones; and for example, as depicted in FIG. 5, the secure transmit zone may be a corporate office 522, and the secure receive zone may be a remote storage/disaster recover area or site 524. In this embodiment, the information needed to synchronize the photonic layer security is sent from the transmit side of the network to the receive side, as represented at 526.

Figure 6:
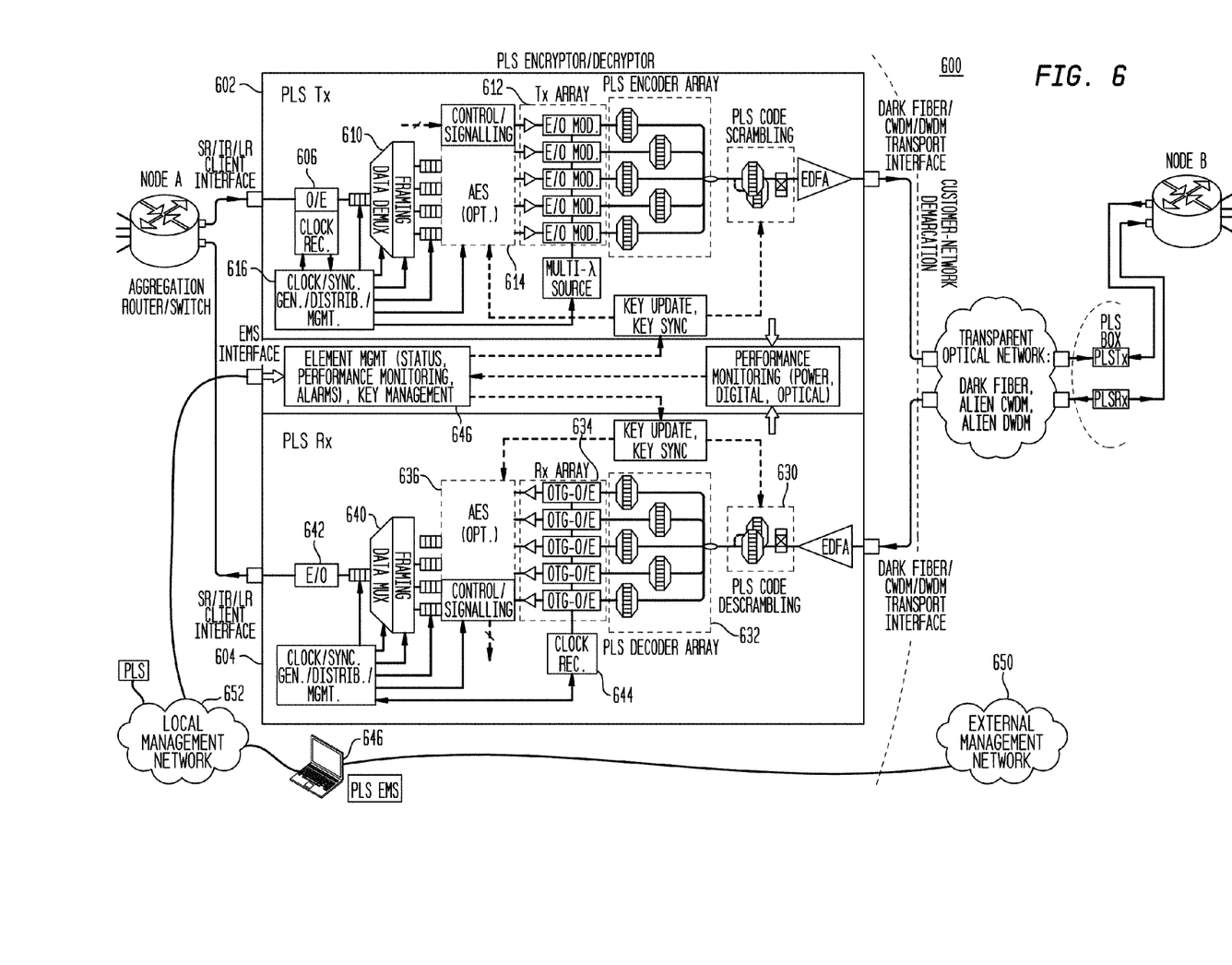
FIG. 6 shows an embodiment of the invention including Photon Layer Security network element with various management modules.

FIG. 6 shows an embodiment of the invention including PLS hardware, and the network 600 of FIG. 6 includes transmit side 602 and receive side 604. On the transmit side, optical signals from node A are converted to electrical signals at 606, these electrical signals are passed through a data demuxer 610. This demuxer separates the electrical signals into a series of individual streams of data, which are sent to electrical/optical modulator 612. An encryption module 614 may be used to encrypt the data prior to the modulation array 612. As indicated in FIG. 6, a clock 616 may be used to synchronize the operation of demuxer 610, modulator 612 and encryptor 614.

From modulator array 612, the data streams are sent through a PLS encoder array 620, and then are combined on code scrambling module 622 in accordance with an embodiment of the invention. From code scrambling module 622, the data are sent to the receive side 604 via an optical network 624.

On the receive side 604, the data are sent through a PLS code descrambling module 630, which separates the data into a series of data streams. The data streams are then sent through a PLS decoder array 632, and then passed through optical-to-electrical array 634. From array 634, the data streams may, if needed, be decrypted at 636. The data streams are then sent through a data mux 640 and E/O converter 642. In this embodiment, a clock 644 may be used to synchronize operation of the O/E array 634, decryptor 636 and data mux 640.

In the embodiment depicted in FIG. 6, feedback from receive side 604 may be sent to node A. Updated encryption keys, and other management information, may be sent to the transmit and receive sides 602 and 604 from a management module 646. In addition, performance data may be exchanged between the transmit and receive sides. In an embodiment, the photonic layer security may be provided by an external management network 650 via a local management network 652.

Embodiments of the invention provide security against archival/forensic attacks and ensure integrity of ultra high bandwidth optical communication data over WDM networks using an affordable and secure key distribution. By phase scrambling the stream carrying the key, the same PLS robustness enjoyed by the data is given to the key exchange.

Key update can be done either inband where the key and instruction for updating is sent with the data, or out of band. In the out of band embodiment key and instruction for updating are sent to both transmitting and receiving ends through a secure communication channel. The security of this channel can be guaranteed quantum key distribution (QKD).

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of encrypting and decrypting optical signals in an optical communication network, comprising:
  encrypting a series of optical signals using a pair of encryptors and an encryption key to form a series of encrypted optical signals;
  decrypting the series of encrypted optical signals; and
  updating the encryption key used to encrypt the series of optical signals, including using a first of the encryptors and a first encryption key to encrypt said series of optical signals; installing a new encryption key on a second of the encryptors; and when the new encryption key is installed on said second of the encryptors, switching the encrypting of the series of optical signals from the first of the encryptors to the second of the encryptors;
  wherein the installing the new encryption key on the second of the encryptors includes installing the new encryption key on the second of the encryptors while using the first of the encryptors and the first encryption key to encrypt the series of optical signals;
  wherein the decrypting includes using a pair of decryptors to decrypt the series of encrypted optical signals; and the updating the encryption key includes using a first of the decryptors and the first encryption key to decrypt the series of encrypted optical signals; installing the new encryption key on a second of the decryptors; and when the new encryption key is installed on the second of the decryptors, switching the decrypting of the series of encrypted optical signals from the first of the decryptors to the second of the decryptors;
  wherein the updating the encryption key further includes, according to synchronizing instructions, synchronizing the switching of the encrypting of the series of optical signals from the first of the encryptors to the second of the encryptors and the switching of the decrypting of the encrypted optical signals from the first of the decryptors to the second of the decryptors, whereby optical signals, of said series of optical signals, that are encrypted using the new encryption key are decrypted using the new encryption key only after said updating;
  wherein the encrypting includes using an encrypt side switch to direct optical signals, of the series of optical signals, selectively to only one of the first and second of the encryptors; and
  the decrypting includes using a decrypt side switch to direct encrypted optical signals, of said series of encrypted optical signals, selectively from only one of the first and second of the decryptors;
  wherein the updating the encryption key includes:
    encrypting the new encryption key using the first encryption key to form an encrypted key; and decrypting the encrypted key, on a receive side of the communications network, for installation in said second of the decryptors; and wherein the updating the encryption key further includes sending the encrypted key, along with the series of encrypted optical signals and the synchronizing instructions, from a transmit side of the communications network to the receive side of the communications network.

2. The method according to claim 1, wherein the encrypting the new encryption key includes passing the new encryption key through said first of the encryptors, and using said first of the encryptors and the first encryption key to encrypt the new encryption key.

3. The method according to claim 1, wherein the decrypting the encrypted key includes passing the encrypted key through the first of the decryptors, and using the first of the decryptors and the first encryption key to decrypt the encrypted key.

4. The method according to claim 1, wherein the updating further includes buffering one or more optical signals, of the series of optical signals, while installing the new encryption key on the second of the encryptors.

5. An optical communications network incorporating photon layer security, comprising:
a transmit side including first and second scramblers using encryption keys to encrypt optical signals to form encrypted optical signals, and a transmit side switch for directing the optical signals selectively to only one of the first and second scramblers;
a receive side including first and second descramblers for using the encryption keys to decrypt the encrypted optical signals, and a receive side switch for selectively directing the decrypted optical signals from only one of the first and second descramblers;
a control system for replacing the encryption keys used to encrypt and decrypt the optical signals by installing new ones of the encryption keys on the first and second scramblers and the first and second descramblers, and for synchronizing operation of the transmit side and receive side switches so that all of the optical signals that are encrypted using a given one of the encryption keys are decrypted using said given one of the encryption keys; and
a management module for sending, along with the encrypted optical signals, the new ones of the encryption keys and management information comprising synchronizing instructions for the transmit side switch, the receive side switch and replacing of the encryption keys;
wherein the replacing the encryption keys on the first and second scramblers and the first and second descramblers is performed according to the management information before the new ones of the encryption keys are used to encrypt or decrypt the optical signals;
wherein the control system replaces said given one of the encryption keys with another one of the encryption keys per instructions in the management information by at least installing said another one of the encryption keys on one of the first and second scramblers and on one of the first and second descramblers, controlling the transmit side switch to direct a group of the optical signals to said one of the first and second scramblers, and controlling the transmit side switch to direct the encrypted optical signals, formed from said group of the optical signals, to said one of the first and second descramblers;
wherein said another one of the encryption keys is sent along with the management information and the encrypted optical signals from the transmit side of the optical communications network to the receive side of the optical communications network; and
wherein said another one of the encryption keys is installed on said one of the first and second scramblers while the other of the first and second scramblers is used to encrypt the optical signals per instructions in the management information.

6. The optical communications network according to claim 5, wherein said another one of the encryption keys is encrypted on the transmit side of the communications network using said given one of the encryption keys to form an encrypted new key, and said encrypted new key is sent from the transmit side of the communications network to the receive side of the communications network.

7. A method of encoding and transmitting optical signals in a communications network, said communications network having a transmit side and a receive side, the method comprising:
on said transmit side of the communications network, modulating each signal of a set of optical signals to form a set of modulated signals,
encoding the set of modulated optical signals by phase shifting at least some of the signals of said set of modulated signals to form a set of encoded modulated signals, and combining the set of encoded modulated signals to form a composite optical signal, and
encrypting the composite optical signal by passing the composite optical signal through a first phase scrambler using an encryption key to encrypt the composite optical signal and form an encrypted optical signal;
on the receive side of the communications network, decrypting the encrypted optical signal by passing the encrypted optical signal through a first phase descrambler using said encryption key to decrypt the encrypted optical signal; and
changing the encryption key used to encrypt the composite optical signal by installing a new encryption key on a second phase scrambler; and when the new encryption key is installed on the second phase scrambler, switching the composite optical signal from the first phase scrambler to the second phase scrambler, and encrypting the composite optical signal using the second phase scrambler and the new encryption key;
wherein the changing of the encryption key occurs on the second phase scrambler while the first phase scrambler is used for encrypting the optical signals;
further comprising changing the encryption key used to decrypt the encrypted optical signal by installing said new encryption key on a second phase descrambler; and when the new encryption key is installed on the second phase descrambler, switching the encrypted composite signal from the first phase descrambler to the second phase descrambler;
wherein the switching the encrypted composite signal includes switching the encrypted composite signal from the first phase descrambler to the second phase descrambler at substantially the same time as the switching of the composite signal from the first phase scrambler to the second phase scrambler; wherein the changing and the switching are performed according to instructions for the first and second phase scrambler and the first and second phase descrambler, the instructions transmitted along with the new encryption key and the composite optical signal before the encryption key is changed.

8. The method according to claim 7, wherein the changing the encryption key includes:

encrypting the new encryption key using another one of the encryption keys to form an encrypted key; and decrypting the encrypted key, on the receive side of the communications network, for installation in said second phase descrambler.

9. The method according to claim 7, wherein said changing the encryption key includes buffering a portion of the composite optical signal while installing the new encryption key on the second phase scrambler.

\* \* \* \* \*

UNITED STATES PATENT AND TRADEMARK OFFICE
CERTIFICATE OF CORRECTION

| | | |
|---|---|---|
| PATENT NO. | : 8,737,618 B2 | Page 1 of 1 |
| APPLICATION NO. | : 12/824610 | |
| DATED | : May 27, 2014 | |
| INVENTOR(S) | : Etemad et al. | |

It is certified that error appears in the above-identified patent and that said Letters Patent is hereby corrected as shown below:

In the Specification

Column 1, Line 10, delete "reference as if set forth at length herein." and insert -- reference herein. --, therefor.

Column 5, Line 32, delete "intercede" and insert -- intercode --, therefor.

Signed and Sealed this
Fourteenth Day of October, 2014

Michelle K. Lee
*Deputy Director of the United States Patent and Trademark Office*